_Patented Sept. 29, 1942_  2,297,039

UNITED STATES PATENT OFFICE 2,297,039

REACTION OF NONCONJUGATED OLEFINIC COMPOUNDS WITH α-β-UNSATURATED CARBONYLIC COMPOUNDS

Johannes Andreas van Melsen, Amsterdam, Netherlands, assignor to Shell Development Company, San Francisco, Calif., a corporation of Delaware No Drawing. Application March 20, 1939, Serial No. 263,056. In the Netherlands March 26, 1938

14 Claims. (Cl. 260—537)

The present invention relates to a process for the production of β-γ-unsaturated carbonylic compounds containing the structural grouping III, by 3,4-addition of non-conjugated olefinic compounds to unsaturated compounds containing an ethylenic linkage in conjugated relation to one or more C=O groups, according to the general equation:

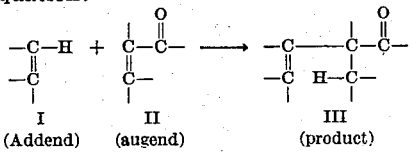

Since this reaction is not, strictly speaking, a condensation, alkenylation or a polymerization, it is referred to herein simply as "reaction by 3,4-addition."

An object of the invention is to provide a method whereby olefines may be reacted with compounds containing the structure II by 3,4-addition with a minimum of loss due to polymerization and other side reactions.

The above reaction, in its broader aspect, is generally applicable to the reaction of non-conjugated olefinic compounds containing an isolated ethylenic linkage in which at least one hydrogen atom is attached to at least one of the unsaturated carbon atoms, by 3,4-addition to unsaturated compounds containing an aliphatic ethylenic linkage in conjugated relation to one or more C=O groups. (By an isolated ethylenic linkage is meant a single ethylenic linkage or an ethylenic linkage too far removed from any other unsaturated bond to be affected by conjugation.) However, since the various addends and augends, containing the structures I and II respectively, all possess varying tendencies to polymerize, and since the above 3,4-addition reaction takes place, in general, at an appreciable rate only at elevated temperatures, such as, for example, from 100° C. to 250° C., in all cases, upon mixing any particular addend with any particular augend and heating to the reaction temperature, the reaction mixture consists of a mixture of products in proportions roughly proportional to the relative tendencies of the 3,4-addition reaction and the various polymerization reactions to take place. Thus, for example, if an easily polymerizable olefinic compound is heated to the reaction temperature with an augend containing the structure II, the predominant reaction is polymerization and such 3,4-addition as does take place takes place predominantly by the addition of a polymerized addend to form high molecular weight products and not with the olefinic compound per se to produce the monomeric β-γ-unsaturated addition product. By simply heating, for example, such easily polymerizable olefinic compounds as, for instance, styrene, methyl styrene, p-hydroxy styrene, vinyl acetate, vinyl chloride, vinyl ethyl ether, non-conjugated terpenes, and the like, to the reaction temperature together with the above augends, high molecular weight resinous products are obtained which contain, in general, only small amounts of the monomeric 3,4-addition product. On the other hand, when employing more difficultly polymerizable olefinic compounds, such as certain secondary mono-olefinic hydrocarbons, according to U. S. Patent No. 2,055,456, for example, the proportions of the monomeric 3,4-addition product in the crude reaction mixture are considerably higher and may under favorable circumstances even constitute the main product. In all cases, however, even when employing the less easily polymerizable olefinic compounds, an appreciable portion, if not the major portion, of the reaction product consists of high molecular weight polymeric products and the yield of the desired 3,4-addition product is correspondingly low.

According to the present invention the desired 3,4-addition reaction is made to proceed at a much faster rate than the various polymerization reactions by executing the reaction in the presence of a catalyst. The result, as can be easily seen, is to materially increase the proportion of the desired 3,4-addition product in the product and increase the yield.

I have found that the desired 3,4-addition reaction may be selectively catalyzed by any one or a mixture of several materials. The most effective catalysts that I have so far found are the ordinarily-solid, common, metals of atomic numbers greater than 21. For example, iron, copper, cobalt, nickel, lead, tin, manganese, chromium, thallium, vanadium, zinc, cadmium and bismuth are suitable. I have furthermore found that these materials are, in general, equally effective in the form of various alloys. Thus, for example, excellent results may be obtained with various alloy steels, such as the various grades of nickel, copper, chromium, and vanadium steels, and the like. Even corrosion resistant alloys give excellent results. Of these various metals, copper, iron and mixtures or alloys thereof with other metals appear to give the best results.

Aside from the metals per se I may, in general, also employ the oxides and the various salts thereof. Although the metal oxides and metal salts do not, in general, afford as high yields of the desired 3,4-addition product as the metals per se, they may, however, be advantageously employed in many cases. The metal salts, for example, although somewhat less effective than the metals may be advantageous in certain cases since they are, in general, effective in even very small amounts. Of the various metal salts those of neutral or basic reaction (i. e. non-acidic) are, in general, superior. One particularly effective group of metal salts are the salts of the above-mentioned group of metals derived from carboxylic acids such as, for instance the acetates, formates, isobutyrates, propionates, oxalates, and the like.

In order to insure the maximum catalytic activity, it is preferable that the metal, if a metal be used, be in a finely divided state. Thus, for example, saw cuttings, fine lathe turnings, or filings, may be used. The best results, however, are obtained with even more finely divided particles, such as copper powder, bronze powder, iron powder and the like.

By executing the reaction according to the present invention in the presence of the above-described catalytic materials, substantial quantities of the monomeric 3,4-addition product may be obtained when employing even the more easily polymerizable non-conjugated olefinic compounds and much better yields of the desired product may be obtained when employing the less easily polymerizable olefinic compounds.

The reaction may be carried into effect by mixing the addend and augend in any desired proportions in any suitable reaction vessel and heating at the desired temperature in the presence of an effective amount of one or a mixture of the above-described catalysts. Although the process may be executed continuously, an intermittent or batch process is very suitable for moderate scale production. In such cases where the reactants have sufficiently high boiling points the reaction may be executed at atmospheric pressure in an open reaction vessel or a reaction vessel equipped with a suitable return condenser. Since, however, it is often desired to employ low boiling olefinic addends and to execute the reaction at a temperature above the boiling point of the reaction mixture, it is usually necessary to execute the reaction in a closed reaction vessel under the autogenic pressure (i. e., the pressure automatically generated by the reaction mixture in a closed vessel at the reaction temperature). For this purpose an autoclave equipped with heating means, and preferably also equipped with stirring and cooling means, is found to be quite suitable. While the addend and augend may be applied in any desired proportion, it is in general, advantageous, as regards the yield of the desired 3,4-addition product, to employ the least easily polymerizable reactant in substantial excess of the stoichiometric quantity. In many cases, however, such as where one of the reactants is relatively costly or where certain economies in the recovery of the reaction product are possible, it may be more advantageous to employ approximately the stoichiometric quantities or an excess of the more easily polymerizable reactant.

While the above catalysts may be advantageously employed in the preparation of monomeric 3,4-addition products using any non-conjugated olefine containing an isolated ethylenic linkage in which at least one hydrogen atom is attached to at least one of the unsaturated carbon atoms, the results may vary considerably depending, among other things, upon the character of the olefine employed. Although the proportion of the desired 3,4-addition product in the reaction product is much higher when the reaction is executed in the presence of a catalyst, the proportion, and hence the yield, is still dependent, although to a lesser extent, upon the relative ease of polymerization of the reactants, chiefly the olefine.

As regards the relative ease of polymerization of the various applicable olefinic compounds, and hence the relative yields of 3,4-addition products obtainable therefrom, it should be noted that such non-conjugated olefinic compounds as, for example, vinyl chloride, vinyl acetate, methyl vinyl ether, and the like, in which the ethylenic linkage is a terminal vinyl group to which a negative substituent is directly attached, have, in general, a strong tendency to polymerize. In view of the lower yields obtainable when employing these easily polymerizable materials, olefinic compounds containing this structure are the least preferred. Furthermore, mono-olefinic compounds such as the acyclic aliphatic mono-olefines (for example, propene, butene-2, pentene-2, hexene-3, decene, hexydecene, propylene trimer, methyl allyl ether, allyl sulfide, allyl acetate, elaidic acid, oleic acid, allyl benzene, allyl cyclohexane, and the like) and alicyclic olefines (for example, cyclohexene, cyclopentene, 1-methyl cyclopentene-2 and the like) are, in general, preferred to olefines which contain a plurality of isolated or accumulated ethylenic linkages such as, for instance, 1,4-cyclohexadiene, 1,5-hexadiene, ethyl cyclohexadiene, 2,6-dimethyl octadiene-2,6, dipentene, limonene, pinene, diprene, terpinolene, non-conjugated polyterpenes, allene and the like. Particularly suitable olefinic compounds to be used in the present process are those containing a branched carbon chain, as examples of which can be mentioned isobutylene, trimethyl ethylene, di-isobutylene, tri-isobutylene and the like.

If desired, a high yield of a mixture of monomeric 3,4-addition products may be produced by using a mixture of olefines. Such mixtures may be prepared very economically, for example, by utilizing the olefine content of various petroleum fractions. Cracked distillates and the various olefine extracts from petroleum processes, such as "Edeleanu extract", for example, are especially suitable. If it is desired that the mixture of monomeric 3,4-addition products be composed of individual componds of closely related properties, an olefinic petroleum distillate boiling closely within the desired range should be chosen. It is often advantageous, especially when employing cracked petroleum distillates, to subject the distillate to a mild refining treatment prior to the reaction. Mixtures of monomeric 3,4-addition products valuable for certain purposes may also be prepared, for example, by employing various fractions of isomeric mono-olefinic hydrocarbons such as may be obtained by polymerizing the lower olefines in a known manner with sulfuric acid, phosphoric acid catalysts, boron fluoride and the like, or by condensing a lower olefinic hydrocarbon with a branched-chain paraffine hydrocarbon.

The yields of the desired 3,4-addition product may also vary considerably depending upon the polymerizing tendency and the reactivity of the augent. Applicable augends include in general the aliphatic α-β-unsaturated ketones, aldehydes, acids, acid chlorides, acid anhydrides, and esters of α-β-unsaturated acids in which the ethylenic linkage is of aliphatic character. In general, the polymerizing tendency is materially less and the activity considerably greater in those augends in which the aliphatic ethylenic linkage is conjugated with respect to two C=O groups. For these reasons augends of this type are, in general, preferred. As examples of these more preferable augends may be mentioned the α-β-unsaturated dialdehydes, diketones, dicarboxylic acids, dicarboxylic acid chlorides, dicarboxylic acid anhydrides and mono- and diesters of dicarboxylic acids. Of these available, α-β-unsaturated dicarbonylic augends those of an acid nature such as maleic acid, fumaric acid, aconitic acid, itaconic acid, isopropylidene malonic acid, fumaramic acid, mesaconic acid, monochloro maleic acid, maleic sulfonic acid, dichloro fumaric acid, fumaryl chloride mesaconyl chloride, maleic chloride, maleic acid anhydride, citraconic acid anhydride, benzyl maleic acid anhydride, phenyl maleic acid anhydride, ethyl maleic acid anhydride, dichloro maleic acid anhydride and the like, give the most useful products and are preferred.

In view of the fact that maleic acid, maleic acid anhydride and fumaric acid are produced in large quantities through the oxidation of benzol and are readily available at a low cost, these augends, as far as the practical application of the process is concerned, are by far the most important.

Aside from the above described augends containing aliphatic ethylenic linkages in conjugated relation to one or more C=O linkages, there also exists a group of applicable compounds, such as maleic acid, which, although not included in the above definition, readily revert under the reaction conditions into compounds of the desired structure. Compounds behaving in this way, since they react as augends in the 3,4-addition reaction only after their self-conversion to the desired α-β-unsaturated structure, are considered in the present instance as full equivalents of the above described compounds.

The amount of catalyst preferably employed depends primarily upon the activity of the catalyst, which, if a metal is employed, is in turn dependent upon the state of subdivision. In general, the less finely divided the metal is, the larger is the quantity required to most effectively catalyze the reaction. Since it is found, however, that in general, the beneficial effect of the catalyst is roughly proportional to the amount present, and since an excess of catalyst is in no way harmful, fairly large quantities of the catalyst are preferably employed. Thus, for example, when employing metal lathe turnings, I often employ a quantity ranging from about 25–100% or higher of the combined weight of the reactants. When employing catalysts in a more finely divided state of subdivision, much smaller quantities may be used with an equivalent effect. Metal salts, when employed, may be used in quantities as low as, for instance 0.5% of the combined weights of the reactants.

In order to insure an even temperature throughout the reaction, and to provide an intimate contact with the catalyst (if a heterogeneous catalyst is used) it is preferable, but not essential, that the mixture be mildly agitated during the reaction. This may be especially advantageous when using finely divided metal powders since they otherwise often tend to settle as a cake on the bottom of the reaction vessel.

The temperature at which the present process is preferably executed depends somewhat upon the activity, heat stability and critical properties of the olefinic addend, as also upon the character of the augend (for instance sometimes the melting point) and varies in general between about 100° and 250° C. In many cases upon reaching the reaction temperature, the temperature of the reaction mixture may rise more or less suddenly due to the heat of the exothermic reaction. In such cases where the temperature increase due to this cause is very pronounced, it is preferable to maintain the reaction mixture within the preferred temperature range by discontinuing the heating, or if necessary by applying suitable cooling.

The reaction time may vary from a few minutes to several hours depending upon the particular reactants and temperatures employed. If desired, the reaction may be executed in the presence of inert solvents or diluents such as aromatic hydrocarbons, aliphatic hydrocarbons, chlorinated paraffins, saturated ethers, saturated esters, and the like and/or in the presence of a third reactant such as an alcohol, epoxide, amine or the like, capable of simultaneously reacting under the prevailing conditions with the augend by other than 3,4-addition.

The desired 3,4-addition product, or products, may be recovered from the reaction mixture, in general, in any one of several ways. Thus, for example, if the reaction mixture, after being freed of the catalyst, is subjected to a suitable fractional distillation, the unconverted reactants are first recovered. Upon continuing the distillation, usually in vacuo, the desired 3,4-addition product is obtained, whilst the various polymeric products remain in the still as a residue. Other methods of recovery especially suitable for the particular product in question will be readily apparent.

According to the process of the present invention, by executing the reaction in the presence of the above described catalytic materials, the ratio of the desired 3,4-addition product to polymerization products in the crude reaction mixture is materially increased and much better yields are obtained. The advantageous results obtained when using the present catalysts are illustrated, for example, in the following table, wherein the results of comparable experiments on the reaction of trimethyl ethylene with maleic anhydride with and without various catalysts are tabulated.

Table I

| Example | Catalyst employed | Ratio of pentenyl succinic anhydride (B. P. 140-143° C. at 9 mm.) to polymeric reaction products |
|---|---|---|
| 1 | None | 0.84:1 |
| 2 | Copper | 2.02:1 |
| 3 | V₂A Steel | 1.68:1 |
| 4 | SM Steel | 1.82:1 |
| 5 | Brass | 1.78:1 |
| 6 | Copper acetate | 1.27:1 |

The 3,4-addition products which may be produced more economically and in materially better yields according to the process of the present invention, are β-γ-unsaturated compounds containing the structural grouping III. As will be apparent from the general reaction, the olefinic addend attaches itself as a radical through one of its ethylenic carbon atoms and without loss of its ethylenic linkage to one of the unsaturated carbon atoms of the conjugated ethylenic group of the augend, and a hydrogen atom from the ethylenic linkage of the addend attaches itself to the other unsaturated carbon atom of the conjugated ethylenic linkage of the augend, whereby the conjugated ethylenic group of the augend disappears. Thus, when reacting an olefinic compound with, for example, maleic or fumaric acid, a compound of the structure

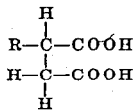

wherein R represents a radical attached through an unsaturated carbon atom and derived from one of the above-described applicable addends by removal of an ethylenic hydrogen atom, is obtained. The present 3,4-addition products are valuable compounds suitable for numerous applications such as, for example, as addition agents for lubricants to improve the lubricating properties and to prevent corrosion of cylinder walls and other metal machine parts; in the permanent water-proofing of fabrics; as reactants in the production of alkyd-type and rezyl-type resins; in the preparation of special detergents, wetting agents, leather treating dopes and many other useful materials. Since, furthermore, the 3,4-addition products retain intact the original C=O group (or groups) of the augend, they may be further reacted according to the usual methods with various agents capable of reacting with carboxylic acids, carboxylic acid chlorids, ketones etc. to form the corresponding amines, amides, esters, ethers, alcohols, thiocyanates, alkali salts, etc.

Having described my invention in a detailed and comprehensive manner and having given specific examples illustrating the advantageous results obtainable thereby, I claim as my invention all that is commensurate with the scope of the appended claims, interpreted as broadly as possible in view of the prior art.

I claim as my invention.

1. A process for the production of valuable 3,4-addition products which comprises reacting a mono-olefinic hydrocarbon with an unsaturated compound selected from the group consisting of maleic acid, maleic acid anhydride and fumaric acid at a temperature between 100° C. and 250° C. in the presence of an effective amount of a finely divided catalytically active material selected from the group consisting of iron, copper, cobalt, nickel, lead, tin, manganese, chromium, thallium, vanadium, zinc, cadmium and bismuth, and oxides and non-acidic carboxylic acid salts thereof.

2. A process for the production of valuable 3,4-addition products which comprises reacting a mono-olefinic compound devoid of conjugation with an unsaturated compound containing an aliphatic ethylenic linkage in conjugated relation to two carboxyl groups at a temperature between 100° C. and 250° C. in the presence of an effective amount of a finely divided catalytically-active material selected from the group consisting of iron, copper, cobalt, nickel, lead, tin, manganese, chromium, thallium, vanadium, zinc, cadmium and bismuth, and oxides and non-acidic carboxylic acid salts thereof.

3. A process for the production of valuable 3,4-addition products which comprises reacting a mono-olefinic compound devoid of conjugation with an unsaturated compound containing an aliphatic ethylenic linkage in conjugated relation to two C=O groups at a temperature between 100° C. and 250° C. in the presence of an effective amount of a finely divided catalytically-active material selected from the group consisting of iron, copper, cobalt, nickel, lead, tin, manganese, chromium, thallium, vanadium, zinc, cadmium and bismuth, and oxides and non-acidic carboxylic acid salts thereof.

4. A process for the production of valuable 3,4-addition products which comprises reacting a mono-olefinic compound devoid of conjugation with an unsaturated compound containing an aliphatic ethylenic linkage in conjugated relation to a C=O group at a temperature between 100° C. and 250° C. in the presence of an effective amount of a finely divided catalytically-active material selected from the group consisting of iron, copper, cobalt, nickel, lead, tin, manganese, chromium, thallium, vanadium, zinc, cadmium and bismuth, and oxides and non-acidic carboxylic acid salts thereof.

5. A process for the production of valuable 3,4-addition products which comprises reacting an olefinic compound containing an isolated ethylenic linkage in which at least one hydrogen atom is attached to at least one of the unsaturated carbon atoms with an unsaturated compound containing an aliphatic ethylenic linkage in conjugated relation to two C=O groups at a temperature between 100° C. and 250° C. in the presence of an effective amount of a finely divided catalytically-active material selected from the group consisting of iron, copper, cobalt, nickel, lead, tin, manganese, chromium, thallium, vanadium, zinc, cadmium and bismuth, and oxides and non-acidic carboxylic acid salts thereof.

6. A process for the production of valuable 3,4-addition products which comprises reacting an olefinic compound containing an isolated ethylenic linkage in which at least one hydrogen atom is attached to at least one of the unsaturated carbon atoms with an unsaturated compound containing an aliphatic ethylenic linkage in conjugated relation to a C=O group at a temperature between 100° C. and 250° C. in the presence of an effective amount of a finely divided catalytically-active carboxylic acid salt of an ordinarily-solid, common metal of the class consisting of iron, copper, cobalt, nickel, lead, tin, manganese, chromium, thallium, vanadium, zinc, cadmium and bismuth.

7. A process for the production of valuable 3,4-addition products which comprises reacting an olefinic compound containing an isolated ethylenic linkage in which at least one hydrogen atom is attached to at least one of the unsaturated carbon atoms with an unsaturated compound containing an aliphatic ethylenic linkage in conjugated relation to a C=O group at a temperature between 100° C. and 250° C. in the presence of an effective amount of finely divided cupreous metal.

8. A process for the production of valuable 3,4-addition products, which comprises reacting an olefinic compound containing an isolated ethylenic linkage in which at least one hydrogen atom is attached to at least one of the unsaturated carbon atoms with an unsaturated compound containing an aliphatic ethylenic linkage in conjugated relation to a C=O group at a temperature between 100° C. and 250° C. in the presence of an effective amount of a finely divided ferrous metal.

9. A process for the production of valuable 3,4-addition products, which comprises reacting an olefinic compound containing an isolated ethylenic linkage in which at least one hydrogen atom is attached to at least one of the unsaturated carbon atoms with an unsaturated compound containing an aliphatic ethylenic linkage in conjugated relation to a C=O group at a temperature between 100° C. and 250° C. in the presence of an effective amount of a finely divided catalytically-active ordinarily-solid common metal of the class consisting of iron, copper, cobalt, nickel, lead, tin, manganese, chromium, thallium, vanadium, zince, cadmium and bismuth.

10. A process for the production of valuable 3,4-addition products, which comprises reacting an olefinic compound containing an isolated ethylenic linkage in which at least one hydrogen atom is attached to at least one of the unsaturated carbon atoms with an unsaturated compound containing an aliphatic ethylenic linkage in conjugated relation to a C=O group at a temperature between 100° C. and 250° C. in the presence of an effective amount of a finely divided catalytically-active material selected from the group consisting of iron, copper, cobalt, nickel, lead, tin, manganese chromium thallium, vanadium, zinc, cadmium and bismuth, and oxides and nonacidic carboxylic acid salts thereof.

11. A process for the production of valuable 3,4-addition products, which comprises reacting a mono-olefinic hydrocarbon having a branched carbon chain with an unsaturated compound selected from the group consisting of maleic acid, maleic acid anhydride and fumaric acid at a temperature between 100° C. and 250° C. in the presence of an effective amount of a finely divided catalytically-active material selected from the group consisting of iron, copper, cobalt, nickel, lead, tin manganese, chromium, thallium, vanadium, zinc, cadmium and bismuth, and oxides and non-acidic carboxylic acid salts thereof.

12. A process for the production of valuable 3,4-addition products, which comprises reacting a mono-olefinic compound devoid of conjugation and containing a branched carbon chain with an unsaturated compound containing an aliphatic ethylenic linkage in conjugated relation to a C=O group, at a temperature between 100° C. and 250° C. in the presence of an effective amount of a finely divided catalytically-active material selected from the group consisting of iron, copper, cobalt, nickel, lead, tin, manganese, chromium, thallium, vanadium, zinc, cadmium and bismuth, and oxides and non-acidic carboxylic acid salts thereof.

13. A process for the production of valuable 3,4-addition products which comprises reacting an olefinic compound containing an isolated ethylenic linkage in which at least one hydrogen atom is attached to at least one of the unsaturated carbon atoms, with unsaturated compound containing an aliphatic ethylenic linkage in conjugated relation to a C=O group, at a temperature between 100° C. and 250° C. in the presence of an effective amount of finely divided copper.

14. A process for the production of valuable 3,4-addition products which comprises reacting a mono-olefinic hydrocarbon having a branched carbon chain with an unsaturated compound containing an aliphatic ethylenic linkage in conjugated relation to a C=O group at a temperature between 100° C. and 250° C. in the presence of an effective amount of finely divided copper.

JOHANNES ANDREAS van MELSEN.